(12) United States Patent
Sievers et al.

(10) Patent No.: US 8,393,598 B2
(45) Date of Patent: Mar. 12, 2013

(54) METHOD AND APPARATUS FOR REMOVING AND REPLACING COMPONENTS OF AN AIRPLANE

(75) Inventors: Michael W Sievers, Kirkland, WA (US); Timothy A George, Renton, WA (US)

(73) Assignee: The Boeing Company, Chicago, IL (US)

( * ) Notice: Subject to any disclaimer, the term of this patent is extended or adjusted under 35 U.S.C. 154(b) by 674 days.

(21) Appl. No.: 12/693,115

(22) Filed: Jan. 25, 2010

(65) Prior Publication Data
US 2011/0146046 A1 Jun. 23, 2011

Related U.S. Application Data

(63) Continuation-in-part of application No. 11/346,475, filed on Feb. 2, 2006, now abandoned.

(51) Int. Cl.
*B60S 9/02* (2006.01)
*B23P 6/00* (2006.01)
*E04G 25/00* (2006.01)
*B23Q 1/25* (2006.01)

(52) U.S. Cl. .... 254/418; 254/419; 29/897.2; 29/402.01; 29/402.03; 29/402.08; 29/426.1; 244/1 R; 244/117 R; 248/351; 248/352

(58) Field of Classification Search .................. 244/1 R, 244/117 R, 118.1; 254/45, 418, 419; 248/351; 248/352; 269/296; 177/136, 146; 29/897.2, 29/402.01, 402.03, 402.08, 426.1
See application file for complete search history.

(56) References Cited

U.S. PATENT DOCUMENTS

| | | | | |
|---|---|---|---|---|
| 2,240,723 A * | 5/1941 | Stoehr | | 414/787 |
| 2,383,491 A * | 8/1945 | Kemmer et al. | | 73/798 |
| 2,391,510 A * | 12/1945 | Pioch et al. | | 29/824 |
| 2,425,273 A * | 8/1947 | Watter | | 73/802 |
| 2,441,381 A * | 5/1948 | Anderson | | 73/183 |
| 2,481,510 A * | 9/1949 | Hollingsworth et al. | | 434/53 |
| 2,803,360 A * | 8/1957 | Straight, Jr et al. | | 254/89 H |
| 3,160,288 A * | 12/1964 | Kelly | | 414/787 |
| 3,731,543 A * | 5/1973 | Gates | | 73/504.02 |
| 4,161,299 A * | 7/1979 | Smisson | | 244/1 R |
| 4,378,098 A * | 3/1983 | Evans | | 244/137.1 |
| 6,257,522 B1 * | 7/2001 | Friend et al. | | 244/118.1 |
| 6,378,387 B1 * | 4/2002 | Froom | | 73/865.8 |
| 6,608,262 B1 * | 8/2003 | Eiswerth et al. | | 177/146 |
| 6,619,127 B2 * | 9/2003 | Miller et al. | | 73/663 |
| 6,637,266 B1 * | 10/2003 | Froom | | 73/583 |
| 7,672,817 B2 * | 3/2010 | Marsh et al. | | 703/2 |

OTHER PUBLICATIONS

Stancil Aviation Enterprises, Ltd., 1975 Cessna 182P Skylane (N877CB), <http://www.aircraftbrowser.com/1975%20Cessna%20182P%20Skylane%20(N877CB). htm> as viewed by www.archive.org on Dec. 19, 2002 via <http://web.archive.org/web/20021219215825/http://www.aircraftbrowser.com/1975+Cessna+182P+Skylane+(N877CB).htm>.

* cited by examiner

*Primary Examiner* — Joseph W Sanderson
(74) *Attorney, Agent, or Firm* — Klintworth & Rozenblat IP LLC

(57) ABSTRACT

Systems and methods are provided for shoring an airplane in order to facilitate the replacement of one or more airplane parts, such as an airplane's upper skin panels, lower skin panels, and/or window assemblies.

22 Claims, 4 Drawing Sheets

METHOD AND APPARATUS FOR REMOVING AND REPLACING COMPONENTS OF AN AIRPLANE

RELATED APPLICATIONS

This application is a continuation-in-part application of, and claims priority to, application Ser. No. 11/346,475, filed on Feb. 2, 2006, which is hereby incorporated by reference.

BACKGROUND OF THE DISCLOSURE

Many existing shoring practices for repairing and/or replacing parts of an airplane require that support equipment such as body cradles be disposed against various portions of the airplane, and additionally require the use of support equipment comprising horizontal stabilizing units. This support equipment is used to support the airplane via the airplane's airframe structure in order keep the airplane off of the ground to facilitate maintenance tasks. In these existing shoring practices, the rigidity of the airplane is primarily dependent upon the airframe structure. For this reason, there is a limit to the amount of airframe structure that can be removed simultaneously. Exceeding these limits will result in deformation and overload of the airframe, which will render the airplane un-airworthy. Often, due to airplane constraints and/or loading limits, additional load bearing supports at other locations are not allowed. When lower fuselage skin panels are replaced, stabilizing beams are often extended through the airplane's windows to allow the cradles to be removed in order to gain access to the lower skin panels. During the replacement procedure the operator must, often in a restricted sequential order, disassemble the upper fuselage lap joints, disassemble the upper fuselage stringer attach points, replace the side window panels, and replace the lower fuselage skin panels. During this procedure, the upper panels often cannot be replaced simultaneously with the lower panels as these panels are required to maintain the airframe alignment since the airplane is being supported by the airframe structure. This process may be inefficient, difficult, timely, and/or costly. In addition, removal of structural components out of sequence, or in too high of quantity, may overload the airframe and render the airplane as un-airworthy and/or un-repairable.

An apparatus and method for use is needed which may solve one or more problems in existing shoring practices to allow more structural components to be removed/replaced simultaneously while maintaining airframe integrity and airworthiness requirements.

SUMMARY OF THE DISCLOSURE

In one aspect of the disclosure, a method may be provided of shoring an airplane to facilitate the removal and replacement of multiple airplane parts. In one step, the airplane may be raised away from a ground surface using at least one first jack. In another step, a plurality of body fittings may be attached to an outer surface of the raised airplane. In still another step, the attached body fittings may be jacked up away from the ground surface using at least one second jack. In an additional step, body cradles may be disposed against the airplane while the airplane is attached to the jacked up body fittings. The body cradles may be supported by at least one third jack supported on the ground surface. In yet another step, at least one beam may be disposed underneath an airplane floor structure of the airplane while the airplane is supported by the body cradles. The at least one beam may be supported by at least one fourth jack. In an additional step, a plurality of upper airplane parts may be removed and replaced from the airplane. The plurality of upper airplane parts may comprise at least one of upper skin panels and upper window assemblies.

In another aspect of the disclosure, a system may be provided for shoring an airplane to facilitate the removal and replacement of multiple airplane parts from an airplane. The multiple airplane parts may comprise at least one of upper skin panels, upper window assemblies, and lower skin panels. The system may comprise at least one first jack, a plurality of body fittings, at least one second jack, a plurality of body cradles, at least one third jack, at least one beam, and at least one fourth jack. The at least one first jack may be disposed against the airplane and may raise the airplane off a ground surface. The plurality of body fittings may be attached to an outer surface of the raised airplane. The plurality of body fittings may be jacked away from the ground surface with the at least one second jack. The plurality of body cradles may be disposed against the airplane. The plurality of body cradles may be jacked away from the ground surface with the at least one third jack. The at least one beam may be disposed underneath an airplane floor structure. The at least one beam may be jacked away from the ground surface with the at least one fourth jack.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
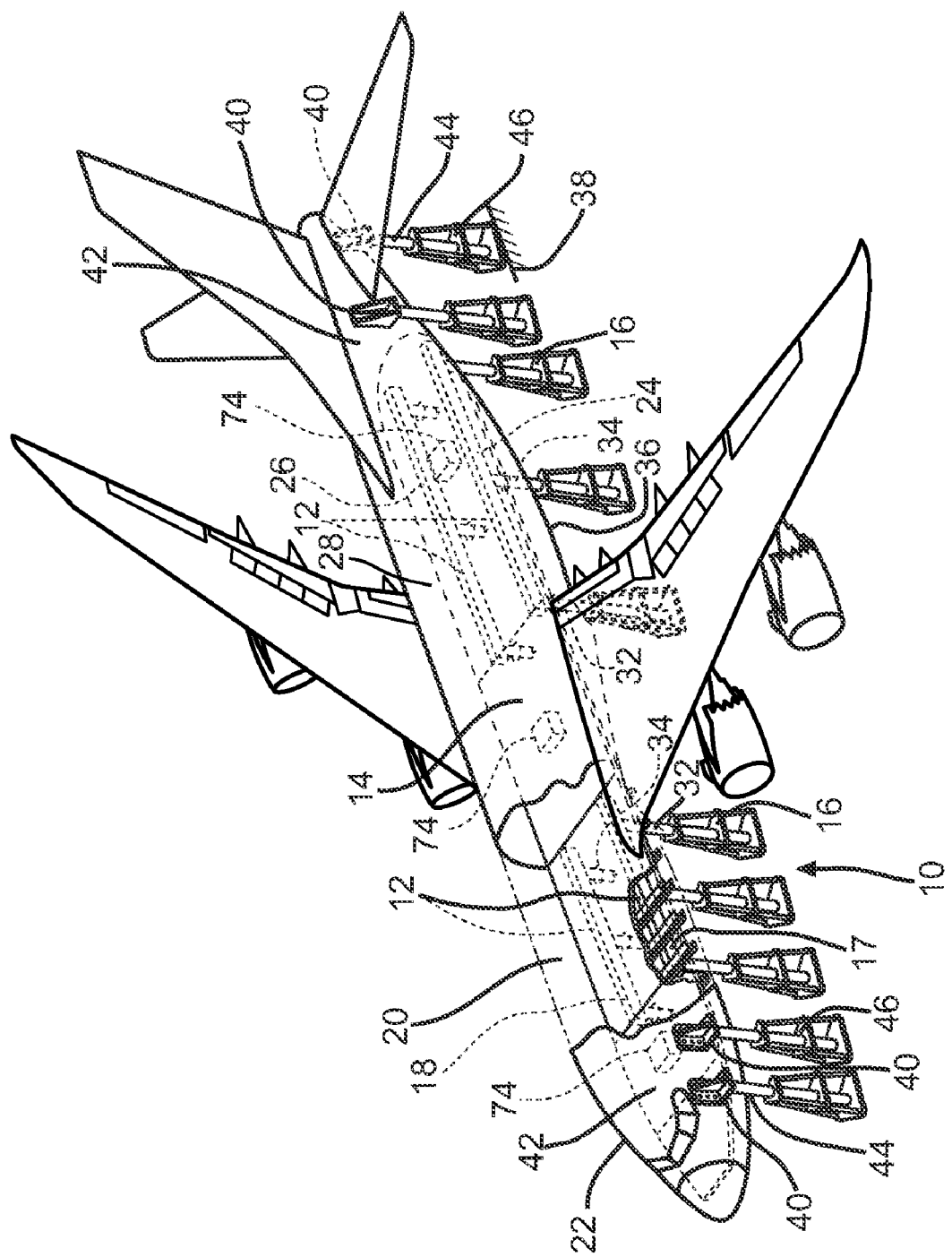
FIG. 1 is a perspective, partial cut-away view of one embodiment of an apparatus under the disclosure.
Figure 2:
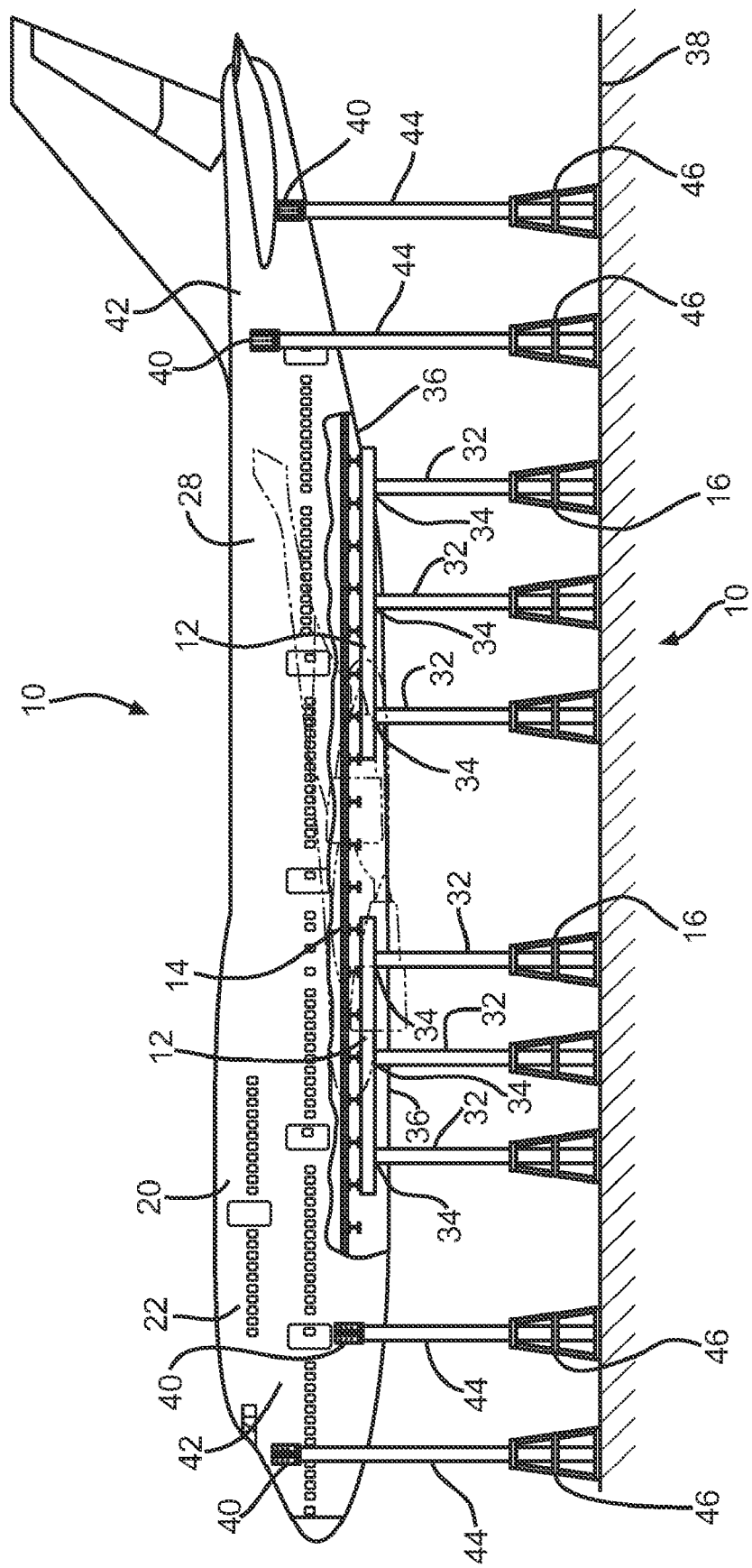
FIG. 2 is a side, partial cut-away view of the apparatus of FIG. 1.

Generally, an apparatus and/or method under the present disclosure may be used to aid in shoring an airplane to facilitate the replacement of one or more airplane parts, such as an airplane's upper skin panels, lower skin panels, and/or window assemblies. The apparatus and/or method of the disclosure may allow for more structural components to be removed/replaced simultaneously then may be removed/replaced using existing shoring apparatus and/or methods while maintaining airframe integrity and airworthiness requirements. This may be accomplished by supporting the airplane alignment via the airplane's floor structure instead of the airplane's airframe structure as done in existing shoring apparatus and/or methods. The apparatus and/or methods of the disclosure not only provide additional ways to support the airplane off of the ground, but also maintain the rigidity required to avoid overloading the remaining airframe structure, to maintain the required airframe alignment, and to maintain the structural integrity, strength, and airworthiness requirements. As shown in FIGS. 1 and 2, in one embodiment of an apparatus under the disclosure to facilitate the replacement of one or more airplane parts, the apparatus 10 may include a plurality of beams 12 disposed underneath an airplane floor structure 14 within the airplane 22, and one or more jacks 16 supporting the beams 12. Two beams 17 and 18 may be disposed in a forward portion 20 of the airplane 22, and two beams 24 and 26 may be disposed in an aft portion 28 of the airplane 22. One or more of the beams 12 may comprise a plurality of discrete beam segments connected together to form an integral beam. The beam segments may be connected together through the use of bolts or other mechanisms known in the art. The beams 12 may be made of one or more varying materials such as aluminum and steel, and may be abutted and/or attached to the bottom of the airplane floor structure 14. In other embodiments, any number of varied material beams 12 may be used in differing shapes, sizes, locations, orientations, and configurations.

The jacks 16 may include one or more vertically extending support posts 32. At least a portion of the jacks 16, which may comprise support posts 32, may extend through one or more holes 34 in a lower skin 36 of the airplane 22. The jacks 16 may be supported by a ground surface 38 and support posts 32 may extend through one or more holes 34 in the airplane's lower skin 36 all the way to the beams 12 disposed within the airplane 22. The jacks 16 may be used to extend the support posts 32 upwardly in order to support the airplane 22 during the replacement of one or more airplane parts, and/or to raise the airplane 22 off the ground during a replacement procedure. Load cells may be used to distribute weight appropriately throughout the jacks 16 and/or beams 12. In one embodiment, two separate jacks 16 and support posts 32 may be utilized on each of two aft beams 24 and 26 and each of two forward beams 17 and 18.

The apparatus 10 may further include one or more body fittings 40 attached to an outer surface 42 of the airplane 22 to aid in shoring up the airplane during the replacement procedure. The body fittings 40 may comprise one or more members, such as plates, which are adapted to be attached to the airplane 22 through the use of bolts, or other mechanisms known in the art. The body fittings 40 may be made of one or more varying materials such as aluminum and steel, and may be attached to forward 20 and aft 28 outer surfaces 42 of the airplane 22. Support posts 44 may extend from jacks 46 on the ground surface 38 to the body fittings 40 attached to the airplane 22. The jacks 46 may be used to extend the support posts 44 upwardly in order to support the airplane 22 during the replacement of one or more airplane parts, and/or to raise the airplane 22 off the ground during a replacement procedure. Load cells may be used to distribute weight appropriately throughout the jacks 46 and/or body fittings 40. In one embodiment, four separate jacks 46, support posts 44, and body fittings 40 may be utilized on each of the nose and tail sections of the airplane 22. In other embodiments, any number of varied material body fittings 40 may be used in differing shapes, sizes, locations, orientations, and configurations.

Figure 3:
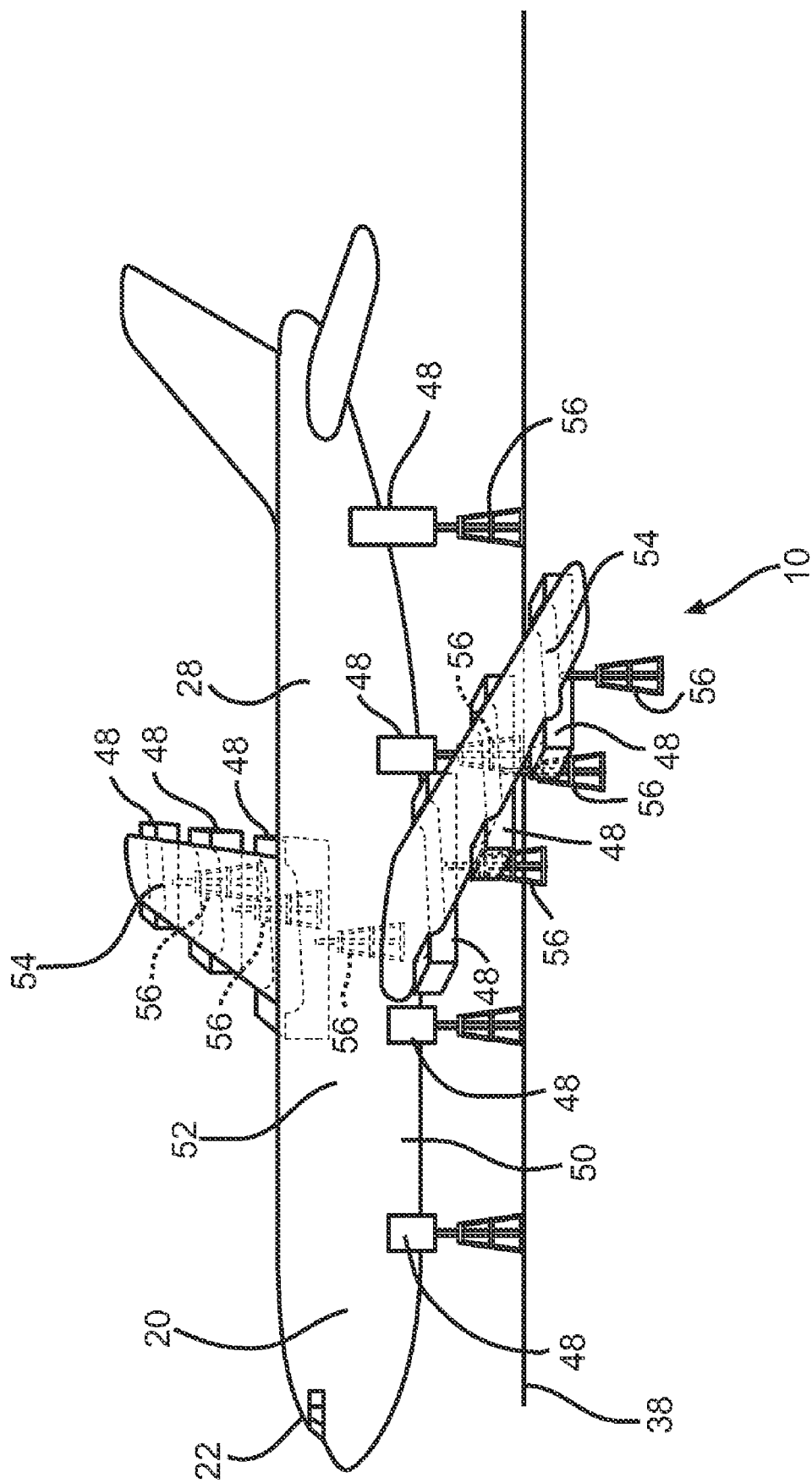
FIG. 3 is a side view of the airplane of FIG. 1 showing only the placement of cradles under the airplane.

As shown in FIG. 3, the apparatus 10 may additionally include one or more cradles 48 disposed against a bottom outer surface 50 of the airplane 22 to shore up the airplane during the replacement procedure. The cradles 48 may comprise curved surfaces contoured to match the contour of the outer surface 50 of the airplane 22. In one embodiment, three cradles may be utilized for each wing, and four cradles may be utilized for the fuselage. The cradles 48 may be made of one or more varying materials such as aluminum and steel, and may be distributed throughout forward 20 and aft 28 portions of the fuselage 52 and over both wings 54 in order to evenly distribute the weight of the airplane 22 in accordance with FAA regulations under 14 CFR 43.13. The cradles 48 may be connected to jacks 56 on the ground surface 38. The jacks 56 may be used to extend the cradles 48 upwardly in order to support the airplane 22 during the replacement of one or more airplane parts, and/or to raise the airplane 22 off the ground during a replacement procedure. Load cells may be used to distribute weight appropriately throughout the jacks 56 and/or cradles 48. In other embodiments, any number of varied material cradles 48 may be used in differing shapes, sizes, locations, orientations, and configurations.

Figure 4:
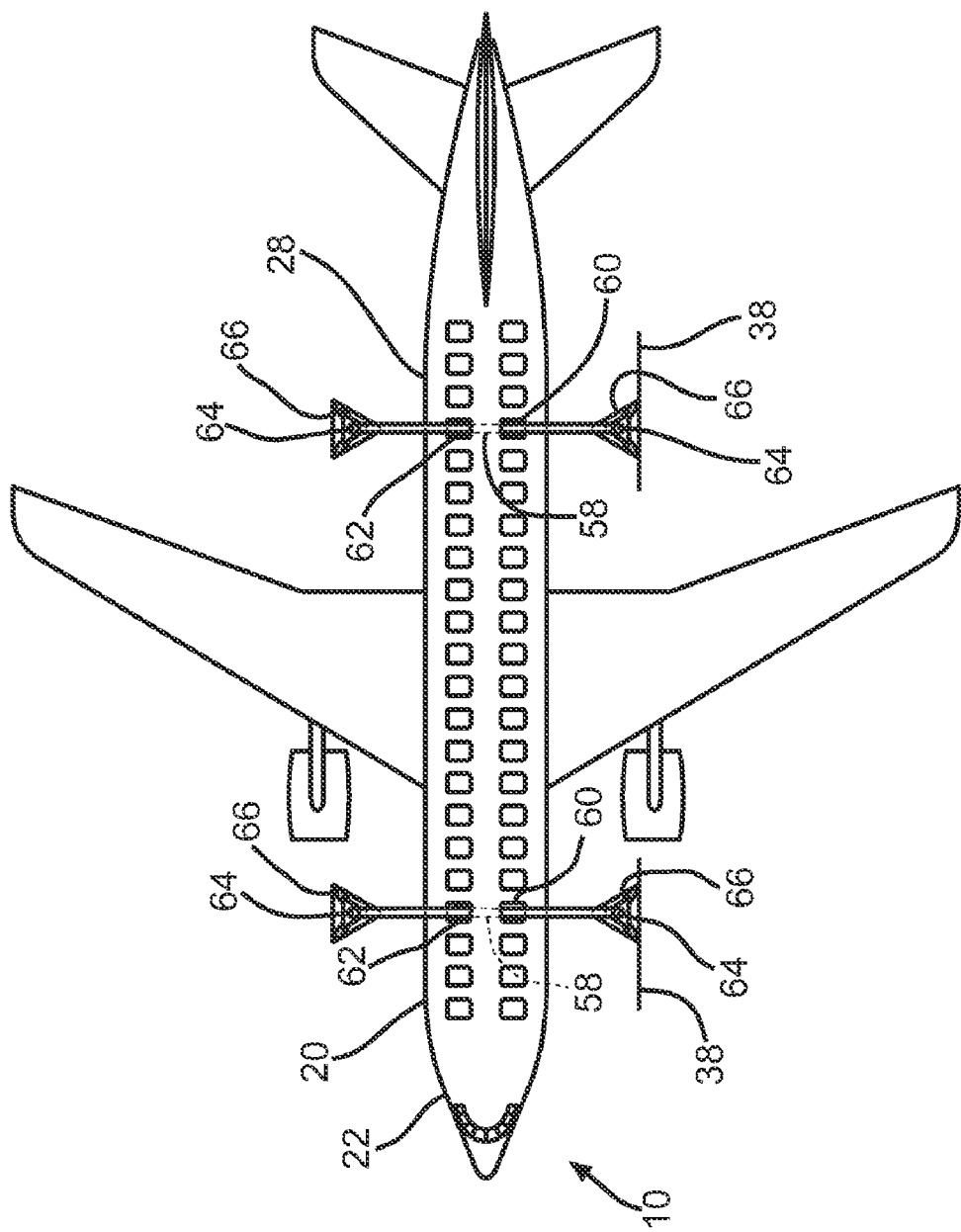
FIG. 4 is a top, partial cut-away view of the airplane of FIG. 1 showing only the placement of window beams extending across the airplane.

As shown in FIG. 4, the apparatus 10 may also include one or beams 58 extending within the airplane from one airplane window 60 to another airplane window 62 to aid in shoring up the airplane during the replacement procedure. In one embodiment, two beams 58 may be extended through windows forward of the wings, and another two beams 58 may be placed through windows aft of the wings. The beams 58 may be supported by one or more connected support structures 64, such as support posts 64 bolted to the beams 58, which extend from the beams 58 to the ground surface 38. The connected support structures 64 may be attached to jacks 66 on the ground surface 38. The beams 58 may be made of one or more varying materials such as aluminum and steel, and may be distributed throughout forward 20 and aft 28 portions of the airplane 22. The beams 58 may aid in supporting the airplane 22 in accordance with FAA regulations under 14 CFR 43.13 to maintain the airplane in a straight and level condition. Load cells may be used to distribute weight appropriately throughout the beams 58 and/or support structures 64. In other embodiments, any number of varied material beams 58 may be used in differing shapes, sizes, locations, orientations, and configurations.

In a varying embodiment of the disclosure, an airplane 22 may be provided having one or more replaced airplane parts, which may comprise one or more replaced upper skin panels, lower skin panels, window assemblies, and/or other types of replaced airplane parts. The one or more replaced airplane parts may have been replaced while one or more beams 12 were temporarily disposed underneath a floor structure 14 of the airplane 22. During that time, the one or more beams 12 may have been abutted and/or attached to the airplane floor structure 14, one or more body fittings 40 may have been attached to the airplane 22, one or more cradles 48 may have been disposed against the airplane 22, and/or one or more beams 58 may have extended between airplane windows 60 and 62. At this same time, one or more jacks 16 may have extended through one or more holes 34 in a lower skin 36 of the airplane 22 in order to support the one or more beams 12. The one or more jacks 16 may have included one or more support posts 32 extending through the one or more holes 34 in the airplane's lower skin 36.

During one embodiment of a shoring procedure under the disclosure to facilitate the replacement of one or more airplane parts, the interior of an airplane 22 may be prepped prior to replacing the parts. The prepping may comprise the removal of the airplane's galley, lavatories, cabin interior, cabin liners, cargo compartment liners, and/or any other interior items which may make the replacement procedure more difficult. The airplane 22 may be jacked up away from the ground to a level position utilizing jacks 74, which may include jacks 74 distributed throughout the airplane's nose, tail, and/or other locations. In one embodiment, the jacks 74 may include one jack on each wing, one jack on the airplane's nose, and one jack on the airplane's tail. During jacking of the airplane, the airplane may be maintained in a straight and level condition in accordance with FAA regulations under 14

CFR 43.13. Body fittings 40 may then be attached to an outer surface 42 of the airplane 22, such as at forward 20 and aft 28 locations of the airplane 22. Preferably, a plurality of body fittings 40 are bolted to a forward portion of the airplane 22 and a plurality of body fittings 40 are bolted to an aft portion of the airplane 22. Support posts 44 may be extended from jacks 46 on the ground surface 38 to the body fittings 40 to further jack-up and support the airplane 22. Load cells may be utilized to distribute weight appropriately throughout the jacks 46 and/or body fittings 40. The maximum load allowable on each support post 44 is preferably not exceeded while maintaining the level position of the airplane 22.

After the body fittings 40 and support posts 44 are in place, the nose and tail jacks 74 may be removed from their positions against the airplane 22. Wing and body cradles 48 may be disposed against the airplane 22 in accordance with FAA regulations under 14 CFR 43.13 in order to evenly distribute the weight of the airplane 22. In one embodiment, three cradles may be utilized for each wing, and four cradles may be utilized for the fuselage. In other embodiments, varying numbers of cradles in various locations may be utilized. The cradles 48 may be connected to jacks 56 on the ground surface 38. The jacks 56 may be used to extend the cradles 48 upwardly in order to further support the airplane 22. Load cells may be used to distribute weight appropriately throughout the jacks 56 and/or cradles 48. The engines may be removed or their weight supported in accordance with FAA regulations under 14 CFR 43.13. One or more holes 34 may be cut in one or more lower skin panels 36 of the airplane 22. Preferably, multiple holes 34 are distributed throughout the lower surface 36 of the airplane. The hole diameters may be in the range of six inches and may be centered between stringers and frames of the airplane 22. In other embodiments, the holes 34 may be of varying sizes, orientations, configurations, and locations. One or more support posts 32 may be extended from jacks 16 on the ground through the one or more holes 34 in the lower skin panels 36 of the airplane 22. Preferably, multiple support posts 32 are used, and one support post 32 extends through each hole 34 distributed throughout the lower surface 36 of the airplane 22. Preferably, at least a 0.12 inch minimum clearance exists between the skin panel access holes 34 and the support posts 32.

One or more beams 12 may be inserted through the cargo bay of the airplane 22 and underneath and/or against an airplane floor structure 14. The beams 12 may be inserted into the cargo bay as separate discrete beam segments and then attached together, using bolts or other known mechanisms, to form one or more integral beams 12. The beams 12 may be placed in stable positions rested on top of the support posts 32 and may be abutted, in substantially parallel positions, against the bottom of the floor structure 14 of the airplane 22. In other embodiments, the beams may be placed in various configurations. Preferably, the beam support posts 32 are located substantially midway between the beams of the airplane floor structure 14. Preferably, the beams 12 are located so that they extend substantially beyond the forward 20 and aft 28 most support posts 32 distributed throughout the airplane 22. In one embodiment, two beams 12 may be disposed in a forward portion 20 of the airplane 22, and two beams 12 may be disposed in an aft portion 28 of the airplane 22. Preferably, each beam 12 is supported by two or more support posts 32. In other embodiments, a varying number of beams 12 may be utilized in varying locations. Preferably, the beams 12 are located in locations and orientations which ensure that the beams 12 are distributed substantially uniformly throughout the airplane 22, and which ensure that the beams 12 make substantially equal contact with the lower surfaces of the affected airplane floor structure 14. Gaps between the beams 12 and floor structure 14 may be shimmed prior to applying full load on the beams 12 to ensure substantially equal contact. Load cells may be connected to the support posts 32 to monitor load. Initially, a five-hundred pound load may be put on each support post 32 prior to proceeding to full load, which may be predetermined based on the support structure and load conditions. The load cells may be monitored to ensure that the maximum load for each support post 32 and/or location is not exceeded. The support posts 32 may support the beams 12 rested under the airplane's floor structure 14, and as a result, the support posts 32 may correspondingly support the floor structure 14 of the airplane 22 during the replacement of airplane parts.

The upper airplane parts, such as the airplane's upper skin panels and upper window assemblies, may then be removed and replaced with new parts. Upon completion, one or more beams 58 may be extended through one or more of the airplane's windows 60 through one or more of the airplane's other windows 62 located on an opposite side of the airplane 22. In one embodiment, the beams 58 may be installed through cabin windows so that the weight of the fuselage is equally distributed throughout the length of the fuselage in accordance with FAA regulations under 14 CFR 43.13. In another embodiment, two beams 58 may be extended through windows forward of the wings, and another two beams 58 may be placed through windows aft of the wings. The beams 58 may be supported by one or more connected support structures 64, such as support posts 64 bolted to the beams 58, which extend from the beams 58 to the ground surface 38. The connected support structures 64 may be attached to jacks 66 on the ground surface 38 to further jack up the airplane 22. The beams 58 may be distributed throughout forward 20 and aft 28 portions of the airplane 22. In other embodiments, any number of varied material beams 58 may be used in differing shapes, sizes, locations, orientations, and configurations. The beams 58 may aid in supporting the airplane 22 in accordance with FAA regulations under 14 CFR 43.13. Load cells may be used to distribute weight substantially appropriately throughout the beams 58 and/or support structures 64. A load of between 500 pounds to 1,500 pounds may be applied on the beams 58 at each window location.

After the beams 58 are fully loaded, the jacks 16 may be lowered to remove the support posts 32 from the holes 34 in the airplane's lower skin 36. The beams 12 may then be disassembled and removed from the airplane's cargo bay. During this process, the load cells connected to the beams 58 and/or support structures 64 may be monitored to ensure that the maximum allowable load is not exceeded. The lower airplane parts, such as the airplane's lower skin panels, may then be removed and replaced with new parts. After the lower airplane parts are replaced, the cradles 48 may be removed from their positions against the airplane 22. The loads on the window beams 58 and body fittings 40 may be monitored using the load cells to ensure that the maximum loads are not exceeded. The window beams 58, body fittings 40, and jacks 66 may then be removed from the airplane 22. The airplane 22 may then be jacked down to the ground utilizing jacks 74 to complete the replacement procedure.

The disclosure may make the process of repairing and/or replacing parts on an airplane less difficult, more efficient, less timely, and/or less costly by allowing more structural components to be removed/replaced simultaneously while maintaining airframe integrity and airworthiness requirements by supporting the airplane alignment via the floor structure instead of the airframe structure. The disclosure not only provides apparatus and methods for supporting an airplane off of the ground, but it also allows for airplane rigidity to be maintained in order to avoid overloading the airframe structure. This allows for the required airframe alignment to be maintained, and also provides for the structural integrity, strength, and airworthiness requirements to be met. The disclosure may allow airplane parts above the floor level to be repaired and/or replaced simultaneously as airplane parts below the floor level. One or more other problems associated with the replacement of airplane parts under existing shoring methods may also be reduced.

It should be understood, of course, that the foregoing relates to exemplary embodiments of the disclosure and that modifications may be made without departing from the spirit and scope of the disclosure as set forth in the following claims.

We claim:

1. A method of shoring an airplane to facilitate the removal and replacement of multiple airplane parts, the method comprising:
    raising said airplane away from a ground surface using at least one first jack;
    attaching a plurality of body fittings to an outer surface of the raised airplane;
    jacking up said attached body fittings away from the ground surface using at least one second jack;
    disposing body cradles against the airplane while the airplane is attached to the jacked up body fittings, wherein the body cradles are supported by at least one third jack supported on the ground surface;
    disposing at least one beam underneath and against an airplane floor structure of the airplane so that the at least one beam is load-bearing and supports a weight of the airplane floor structure, while the airplane is supported by the body cradles, wherein said at least one beam is supported by at least one fourth jack; and
    removing and replacing a plurality of upper airplane parts, comprising at least one of upper skin panels or upper window assemblies, from the airplane.

2. The method of claim 1, wherein the disposing the at least one beam underneath and against the airplane floor structure comprises disposing first and second beams underneath and against a forward portion of said airplane floor structure, and disposing third and fourth beams underneath and against an aft portion of said airplane floor structure.

3. The method of claim 2, wherein each of said first, second, third, and fourth beams are supported by two or more support posts.

4. The method of claim 1, wherein said at least one beam comprises a plurality of connected beam segments.

5. The method of claim 4, wherein said plurality of beam segments are connected together by bolts.

6. The method of claim 1, wherein the disposing the at least one beam underneath and against the airplane floor structure of the airplane so that the at least one beam is load-bearing and supports the weight of the airplane floor structure further comprises moving the at least one beam from a first position located completely outside of the airplane to a second position located underneath and against the airplane floor structure of the airplane so that the at least one beam is load-bearing and supports the weight of the airplane floor structure, while the airplane is supported by the body cradles, wherein said at least one beam is supported by the at least one fourth jack.

7. The method of claim 6, wherein the disposing the at least one beam underneath and against the airplane floor structure of the airplane so that the at least one beam is load-bearing and supports the weight of the airplane floor structure further comprises moving the at least one beam from the first position located completely outside of the airplane, through a cargo bay of the airplane, to the second position located underneath and against the airplane floor structure of the airplane so that the at least one beam is load-bearing and supports the weight of the airplane floor structure, while the airplane is supported by the body cradles, wherein said at least one beam is supported by the at least one fourth jack.

8. The method of claim 1, wherein a portion of said at least one fourth jack supporting said at least one beam comprises at least one support post extending through at least one hole in a lower skin of the airplane.

9. The method of claim 1, wherein said at least one beam is made at least partially of at least one of aluminum or steel.

10. The method of claim 1, further comprising moving the at least one beam disposed underneath and against the airplane floor structure away from the ground surface using said at least one fourth jack.

11. The method of claim 1, wherein the raising said airplane away from the ground surface using said at least one first jack comprises raising the airplane with nose and tail jacks, and further comprising removing the nose and tail jacks from the airplane after the attached body fittings are jacked up away from the ground surface.

12. The method of claim 1, further comprising bolting some of the body fittings to a forward portion of the airplane and bolting some of the body fittings to an aft portion of the airplane.

13. The method of claim 1, further comprising jacking up said body cradles away from the ground surface using said at least one third jack.

14. The method of claim 1, wherein the disposing said body cradles against the airplane comprises disposing at least one of the cradles against a fuselage of the airplane and disposing at least another of the cradles against a wing of the airplane.

15. The method of claim 1, further comprising cutting at least one hole in a lower skin of said airplane and extending at least a portion of said at least one fourth jack through said at least one hole.

16. The method of claim 1, further comprising extending at least one supported beam from one airplane window to another airplane window after the upper airplane parts have been removed and replaced.

17. The method of claim 16, further comprising, after the upper airplane parts have been removed and replaced and the at least one supported beam has been extended from the one airplane window to the another airplane window, removing said at least one beam underneath the airplane floor structure from the airplane, and removing and replacing a plurality of lower airplane parts comprising lower skin panels.

18. The method of claim 17, further comprising removing said body cradles from against the airplane after removing and replacing said plurality of lower airplane parts.

19. The method of claim 18, further comprising, after removing and replacing said plurality of lower airplane parts, jacking down the airplane to the ground surface and removing from the airplane said body fittings and said at least one supported beam extending between the airplane windows.

20. A system for shoring an airplane to facilitate the removal and replacement of multiple airplane parts, comprising at least one of upper skin panels, upper window assemblies, or lower skin panels, from an airplane, the system comprising:
    at least one first jack disposed against the airplane and raising the airplane off a ground surface;

a plurality of body fittings attached to an outer surface of the raised airplane, wherein the body fittings are jacked away from the ground surface with at least one second jack;

a plurality of body cradles disposed against the airplane, wherein the body cradles are jacked away from the ground surface with at least one third jack; and at least one beam disposed underneath and against an airplane floor structure, the at least one beam being load-bearing and supporting a weight of said airplane floor structure, wherein said at least one beam is jacked away from the ground surface with at least one fourth jack.

21. The system of claim 20, wherein said at least one beam is attached to said airplane floor structure.

22. The system of claim 20, wherein the system further comprises at least one beam for extending from one airplane window to another airplane window in order to support the plane when lower skin panels are removed from the airplane.

\* \* \* \* \*